United States Patent
Baltas

(10) Patent No.: US 9,885,313 B2
(45) Date of Patent: Feb. 6, 2018

(54) GAS TURBINE ENGINE BIFURCATION LOCATED FAN VARIABLE AREA NOZZLE

(75) Inventor: Constantine Baltas, Manchester, CT (US)

(73) Assignee: United Technologes Corporation, Farmington, CT (US)

(*) Notice: Subject to any disclaimer, the term of this patent is extended or adjusted under 35 U.S.C. 154(b) by 1009 days.

(21) Appl. No.: 13/343,964

(22) Filed: Jan. 5, 2012

(65) Prior Publication Data

US 2012/0102915 A1    May 3, 2012

Related U.S. Application Data

(63) Continuation-in-part of application No. 12/441,546, filed on Mar. 17, 2009, now Pat. No. 8,418,471.

(51) Int. Cl.
| | |
|---|---|
| F02K 1/06 | (2006.01) |
| F02K 1/15 | (2006.01) |
| F02K 3/06 | (2006.01) |
| F02K 1/12 | (2006.01) |
| F02K 3/075 | (2006.01) |
| F02C 3/107 | (2006.01) |
| F02K 1/30 | (2006.01) |

(52) U.S. Cl.
CPC .......... *F02K 1/15* (2013.01); *F02K 1/06* (2013.01); *F02K 3/06* (2013.01); F02C 3/107 (2013.01); F02K 1/12 (2013.01); F02K 1/1207 (2013.01); F02K 1/30 (2013.01); F02K 3/075 (2013.01); F05D 2220/326 (2013.01); F05D 2220/327 (2013.01)

(58) Field of Classification Search
CPC . F02K 1/12; F02K 1/1207; F02K 3/06; F02K 3/075; F02K 3/077
USPC .................................. 60/226.1, 226.3, 771
See application file for complete search history.

(56) References Cited

U.S. PATENT DOCUMENTS

| | | |
|---|---|---|
| 3,287,906 A | 11/1966 | McCormick |
| 3,754,484 A | 8/1973 | Roberts |
| 3,892,358 A | 7/1975 | Gisslen |
| 4,130,872 A | 12/1978 | Harloff |
| 4,251,987 A | 2/1981 | Adamson |
| 4,827,712 A * | 5/1989 | Coplin .................. 60/226.1 |

(Continued)

FOREIGN PATENT DOCUMENTS

| | | |
|---|---|---|
| EP | 0469825 A2 | 2/1992 |
| EP | 0743434 A1 | 5/1996 |

(Continued)

OTHER PUBLICATIONS

Rauch, D., "Design Study of an Air Pump and Integral Lift Engine ALF-504 Using the Lycoming 502 Core", NASA Report CR-120992, NASA Lewis Research Center, Cleveland, Ohio, 1972, pp. 1-182.*

(Continued)

*Primary Examiner* — Lorne Meade
(74) *Attorney, Agent, or Firm* — Carlson, Gaskey & Olds, PC

(57) ABSTRACT

A gas turbine engine includes a core engine defined about an axis, a gear system driven by the core engine, a fan, and a variable area flow system. The gear system defines a gear reduction ratio of greater than or equal to about 2.3. The fan is driven by the gear system about the axis to generate a bypass flow. The variable area flow system operates to effect the bypass flow.

31 Claims, 2 Drawing Sheets

(56) References Cited

U.S. PATENT DOCUMENTS

| | | | | |
|---|---|---|---|---|
| 4,885,912 | A | * | 12/1989 | Nakhamkin ............... 60/652 |
| 5,123,242 | A | * | 6/1992 | Miller ............... F02C 7/14 165/300 |
| 5,203,163 | A | | 4/1993 | Parsons |
| 5,319,927 | A | * | 6/1994 | Maguire ............... F02C 7/042 60/226.1 |
| 5,433,674 | A | | 7/1995 | Sheridan et al. |
| 5,447,411 | A | | 9/1995 | Curley et al. |
| 5,467,941 | A | * | 11/1995 | Chee ............... B64D 27/18 244/54 |
| 5,524,847 | A | | 6/1996 | Brodell et al. |
| 5,729,969 | A | * | 3/1998 | Porte ............... F02C 6/08 60/226.1 |
| 5,778,659 | A | | 7/1998 | Duesler et al. |
| 5,857,836 | A | | 1/1999 | Stickler et al. |
| 5,915,917 | A | | 6/1999 | Eveker et al. |
| 5,975,841 | A | | 11/1999 | Lindemuth et al. |
| 6,223,616 | B1 | | 5/2001 | Sheridan |
| 6,318,070 | B1 | | 11/2001 | Rey et al. |
| 6,814,541 | B2 | | 11/2004 | Evans et al. |
| 6,820,410 | B2 | * | 11/2004 | Lair ............... B64D 33/04 239/265.11 |
| 6,964,155 | B2 | * | 11/2005 | McCune et al. ............ 60/226.1 |
| 6,983,588 | B2 | | 1/2006 | Lair |
| 7,021,042 | B2 | | 4/2006 | Law |
| 7,451,592 | B2 | * | 11/2008 | Taylor et al. ............... 60/268 |
| 7,574,856 | B2 | * | 8/2009 | Mak ............... F01K 23/10 60/39.182 |
| 7,591,754 | B2 | | 9/2009 | Duong et al. |
| 7,607,308 | B2 | * | 10/2009 | Kraft ............... F02C 6/08 60/226.1 |
| 7,824,305 | B2 | | 11/2010 | Duong et al. |
| 7,886,520 | B2 | * | 2/2011 | Stretton ............... F01D 17/105 239/265.17 |
| 7,926,260 | B2 | | 4/2011 | Sheridan et al. |
| 7,997,082 | B2 | | 8/2011 | Beardsley |
| 8,205,432 | B2 | | 6/2012 | Sheridan |
| 8,418,471 | B2 | * | 4/2013 | Baltas ............... 60/772 |
| 2007/0245739 | A1 | * | 10/2007 | Stretton ............... F01D 17/105 60/728 |
| 2009/0053058 | A1 | | 2/2009 | Kohlenberg et al. |
| 2009/0288387 | A1 | * | 11/2009 | Baltas ............... 60/204 |
| 2010/0148396 | A1 | | 6/2010 | Xie et al. |
| 2010/0331139 | A1 | | 12/2010 | McCune |
| 2011/0173990 | A1 | | 7/2011 | Thies |

FOREIGN PATENT DOCUMENTS

| | | |
|---|---|---|
| EP | 1936172 A2 | 6/2008 |
| EP | 1956224 A2 | 8/2008 |
| FR | 2889254 | 2/2007 |
| FR | 2891313 | 3/2007 |
| GB | 1516041 | 6/1978 |
| GB | 2041090 | 9/1980 |
| GB | 2437377 | 10/2007 |
| WO | 03099654 A2 | 12/2003 |
| WO | 2007038674 | 4/2007 |
| WO | 2008045034 A1 | 4/2008 |
| WO | 2008045062 A1 | 4/2008 |
| WO | 2008045074 A1 | 4/2008 |
| WO | 2008045093 A1 | 4/2008 |

OTHER PUBLICATIONS

Penner et al., "Aviation and the Global Atmosphere", Cambridge University Press, UK, 1999, pp. 1-2.*
Boggia, S. and Rud, K., "Intercooled Recuperated Gas Turbine Engine Concept", AIAA-2005-4192, 41st AIAA/ASME/SAE/ASEE Joint Propulsion Conference & Exhibit, Jul. 10-13, Tucson, Arizona, 2005, pp. 1-11.*
Jane's Aero-Engines, Issue Seven, Edited by Bill Gunston, Jane's Information Group Inc., Alexandria, Virginia, 2000, pp. 1-47 and 510-512.*
Wilfert, Gunter, "Geared Fan", Aero-Engine Design: From State of the Art Turbofans Towards Innovative Architectures, von Karman Institute for Fluid Dynamics, Belgium, Mar. 3-7, 2008, pp. 1-26.*
Hall, C.A., and Crichton, D., "Engine Design Studies for a Silent Aircraft", Journal of Turbomachinery, vol. 129, Jul. 2007, pp. 479-487 (paper presented at ASME Turbo Expo 2006: Power for Land, Sea, and Air, GT2006-90559, Barcelona, Spain, May 8-11, 2006, pp. 1653-1662).*
Huff, Dennis, "Technologies for Aircraft Noise Reduction", NASA Glenn Research Center, West Park Airport Committee Meeting, Feb. 16, 2006, pp. 1-23.*
Engber et al., "Advanced Technologies for Next Generation Regional Jets—Survey of Research Activities at MTU Aero Engines", Proceedings:XVIII International Symposium on Air Breathing Engines (ISABE), ISABE-2007-1282, 18th ISABE Conference, Beijing, China, Sep. 2-7, 2007, pp. 1-11.*
Warwick, G., "Civil Engines: Pratt & Whitney gears up for the future with GTF", Flight International, Nov. 2007, accessed on Jul. 17, 2015 at http://www.flightglobal.com/news/articles/civil-engines-pratt-amp-whitney-gears-up-for-the-future-with-gtf.*
Coy, Peter, "The Little Gear That Could Reshape the Jet Engine", Bloomberg Business, Oct. 15, 2015, pp. 1-4 [accessed on Nov. 10, 2015 at http://www.bloomberg.com/news/articles/2015-10-15/pratt-s-purepower-gtf-jet-engine-innovation-took-almost-30-years].*
Read, Bill, "Powerplant Revolution", AeroSpace, May 2014, pp. 28-31.*
Kjelgaard, C., "Gearing Up for the GTF", Aircraft Technology, Issue 105, Apr.-May 2010, pp. 86, 88, 90, 92-95.*
Lord, Wes K., "P&W Expectations", Quiet Aircraft Technology Workshop, Dallas, Texas, Apr. 11-12, 2000.*
Lord, et al., "Flow Control Opportunities in Gas Turbine Engines" AIAA 2000-2234, Fluids 2000, Denver, Colorado, Jun. 19-22, 2000, pp. 1-15.*
Search Report and Written Opinion for PCT/US2006/040251.
Notification of Transmittal of the International Preliminary Report on Patentability dated Jan. 27, 2009 for PCT/U52006/040251.
International Search Report and Written Opinion for International Application No. PCT/US2013/020077 dated Sep. 10, 2013.
Singapore Search Report for Singapore Application No. 11201402896P dated May 8, 2015.
European Search Report for European Patent Application No. 13749845.7, dated Aug. 12, 2015.
Conference on Engineering and Physics: Synergy for Success 2006. Journal of Physics: Conference Series vol. 105. London, UK. Oct. 5, 2006.
Kurzke, J. (2009). Fundamental differences between conventional and geared turbofans. Proceedings of ASME Turbo Expo: Power for Land, Sea, and Air. 2009, Orlando, Florida.
Agarwal, B.D and Broutman, L.J. (1990). Analysis and performance of fiber composites, 2nd Edition. John Wiley & Sons, Inc. New York: New York.
Carney, K., Pereira, M. Revilock, and Matheny, P. Jet engine fan blade containment using two alternate geometries. 4th European LS-DYNA Users Conference.
Brines, G.L. (1990). The turbofan of tomorrow. Mechanical Engineering: The Journal of the American Society of Mechanical Engineers,108(8), 65-67.
Faghri, A (1995). Heat pipe and science technology. Washington, D.C: Taylor & Francis.
Hess, C. (1998). Pratt & Whitney develops geared turbofan. Flug Revue 43(7). Oct. 1998.
Grady, J.E., Weir, D.S., Lamoureux, M.C., and Martinez, M.M. (2007). Engine noise research in NASA's quiet aircraft technology project. Papers from the International Symposium on Air Breathing Engines (ISABE). 2007.
Griffiths, B. (2005). Composite fan blade containment case. Modern Machine Shop. Retrieved from: http://www.mmsonline.com/articles/composite-fan-blade-containment-case.
Hall, C.A. and Crichton, D. (2007). Engine design studies for a silent aircraft. Journal of Turbomachinery, 129, 479-487.

(56) References Cited

OTHER PUBLICATIONS

Haque, A. and Shamsuzzoha, M., Hussain, F., and Dean, D. (2003). S20-glass/epoxy polymer nanocomposites: Manufacturing, structures, thermal and mechanical properties. Journal of Composite Materials, 37 (20), 1821-1837.

Brennan, P.J. and Kroliczek, E.J. (1979). Heat pipe design handbook. Prepared for National Aeronautics and Space Administration by B & K Engineering, Inc. Jun. 1979.

Horikoshi, S. and Serpone, N. (2013). Introduction to nanoparticles. Microwaves in nanoparticle synthesis. Wiley-VCH Verlag GmbH & Co. KGaA.

Kerrebrock, J.L. (1977). Aircraft engines and gas turbines. Cambridge, MA: The MIT Press.

Xie, M. (2008). Intelligent engine systems: Smart case system. NASA/CR-2008-215233.

Knip, Jr., G. (1987). Analysis of an advanced technology subsonic turbofan incorporating revolutionary materials. NASA Technical Memorandum. May 1987.

Willis, W.S. (1979). Quiet clean short-haul experimental engine (QCSEE) final report NASA/CR-159473.

Kojima, Y., Usuki, A. Kawasumi, M., Okada, A., Fukushim, Y., Kurauchi, T., and Kamigaito, O. (1992). Mechanical properties of nylon 6-clay hybrid. Journal of Materials Research, 8(5), 1185-1189.

Kollar, L.P. and Springer, G.S. (2003). Mechanics of composite structures. Cambridge, UK: Cambridge University Press.

Ramsden, J.M. (Ed). (1978). The new European airliner. Flight International, 113(3590). Jan. 7, 1978.

Langston, L. and Faghri, A. Heat pipe turbine vane cooling. Prepared for Advanced Turbine Systems Annual Program Review. Morgantown, West Virginia. Oct. 17-19, 1995.

Oates, G.C. (Ed). (1989). Aircraft propulsion systems and technology and design. Washington, D.C.: American Institute of Aeronautics, Inc.

Lau K Gu, C. and Hui, D.(2005). A critical review on nanotube and nanotube/nanoclay related polymer composite materials. Composites: Part B 37(2006) 425-436.

Shorter Oxford English dictionary, 6th Edition. (2007). vol. 2, N-Z. p. 1888.

Lynwander, P. (1983). Gear drive systems: Design and application. New York, New York: Marcel Dekker, Inc.

Sweetman, B and Sutton, O. (1998). Pratt & Whitney's surprise leap. Interavia Business & Technology, 53.621, p. 25.

Mattingly, J.D. (1996). Elements of gas turbine propulsion. New York, New York: McGraw-Hill, Inc.

Pyrograf-III Carbon Nanofiber. Product guide. Retrieved from: http://pyrografproducts.com/Merchant5/merchant.mvc?Screen=cp_nanofiber.

Nanocor Technical Data for Epoxy Nanocomposites using Nanomer 1.30E Nanoclay. Nnacor, Inc.

Ratna, D. (2009). Handbook of thermoset resins. Shawbury, UK: iSmithers.

Wendus, BE., Stark, D.F., Holler, RP., and Funkhouser, M.E. (2003). Follow-on technology requirement study for advanced subsonic transport. NASN/CR-2003-212467.

Silverstein, C.C., Gottschlich, J.M., and Meininger, M. The feasibility of heat pipe turbine vane cooling. Presented at the International Gas Turbine and Aeroengine Congress and Exposition, The Hague, Netherlands. Jun. 13-16, 1994.

Merriam-Webster's collegiate dictionary, 11th Ed. (2009). p. 824.

Merriam-Webster's collegiate dictionary, 10th Ed. (2001). p. 1125-1126.

Whitaker, R. (1982). ALF 502: plugging the turbofan gap. Flight International, p. 237-241, Jan. 30, 1982.

Hughes, C. (2010). Geared turbofan technology. NASA Environmentally Responsible Aviation Project. Green Aviation Summit. NASA Ames Research Center. Sep. 8-9, 2010.

File History for U.S. Appl. No. 12/131,876.

Cusick, M. (1981). Avco Lycoming's ALF 502 high bypass fan engine. Society of Automotive Engineers, inc. Business Aircraft Meeting & Exposition. Wichita, Kansas. Apr. 7-10, 1981.

Fledderjohn, K.R. (1983). The TFE731-5: Evolution of a decade of business jet service. SAE Technical Paper Series. Business Aircraft Meeting & Exposition. Wichita, Kansas. Apr. 12-15, 1983.

Dickey, T.A. and Dobak, E.R. (1972). The evolution and development status of ALF 502 turbofan engine. National Aerospace Engineering and Manufacturing Meeting. San Diego, California. Oct. 2-5, 1972.

Gunston, B. (Ed.) (2000). Jane's aero-engines, Issue seven. Coulsdon, Surrey, UK: Jane's Information Group Limited.

Ivchenko-Progress D-436. Jane's Aero-engines, Aero-engines- Turbofan. Feb. 8, 2012.

Ivchenko-Progress AI-727M. Jane's Aero-engines, Aero-engines-Turbofan. Nov. 27, 2011.

Ivchenko-Progress D-727. Jane's Aero-engines, Aero-engines- Turbofan. Feb. 7, 2007.

Turbomeca Aubisque. Jane's Aero-engines, Aero-engines- Turbofan. Nov. 2, 2009.

Aviadvigatel D-110. Jane's Aero-engines, Aero-engines—Turbofan. Jun. 1, 2010.

Rolls-Royce M45H. Jane's Aero-engines, Aero-engines—Turbofan. Feb. 24, 2010.

Honeywell LF502. Jane's Aero-engines, Aero-engines—Turbofan. Feb. 9, 2012.

Honeywell LF507. Jane's Aero-engines, Aero-engines—Turbofan. Feb. 9, 2012.

Honeywell TFE731. Jane's Aero-engines, Aero-engines—Turbofan. Jul. 18, 2012.

NASA Conference Publication. Quiet, powered-lift propulsion. Cleveland, Ohio. Nov. 14-15, 1978.

"Civil Turbojet/Turbofan Specifications", Jet Engine Specification Database (Apr. 3, 2005).

Kandebo, S.W. (1993). Geared-turbofan engine design targets cost, complexity. Aviation Week & Space Technology, 148(8), p. 32.

Hendricks, E.S. and Tong, M.T. (2012). Performance and weight estimates for an advanced open rotor engine. NASA/TM-2012-217710.

Guynn, M. D., Berton, J.J., Fisher, K. L., Haller, W.J., Tong, M. T., and Thurman, D.R. (2011). Refined exploration of turbofan design options for an advanced single-aisle transport. NASA/TM-2011-216883.

Zalud, T. (1998). Gears put a new spin on turbofan performance. Machine Design, 70(20), p. 104.

European Search Report for European Patent Application No. 15169575.6 dated Sep. 7, 2015.

\* cited by examiner

GAS TURBINE ENGINE BIFURCATION LOCATED FAN VARIABLE AREA NOZZLE

REFERENCE TO RELATED APPLICATIONS

This application is a continuation in part of U.S. patent application Ser. No. 12/441,546, filed Mar. 17, 2009.

BACKGROUND OF THE INVENTION

The present invention relates to a gas turbine engine, and more particularly to a turbofan engine having a bifurcation which effectively varies a fan nozzle exit area by adjusting a variable area flow system within the bifurcation to selectively vary the bypass area through which bypass flow may pass.

Conventional gas turbine engines include a fan section and a core engine with the fan section having a larger diameter than that of the core engine. The fan section and the core engine are disposed in series along a longitudinal axis and are enclosed in a nacelle. An annular stream of primary airflow passes through a radially inner portion of the fan section and through the core engine to generate primary thrust.

Combustion gases are discharged from the core engine through a primary airflow path and are exhausted through a core exhaust nozzle. An annular fan flow path, disposed radially outwardly of the primary airflow path, passes through a radial outer portion between a fan nacelle and a core nacelle and is discharged through an annular fan exhaust nozzle defined at least partially by the fan nacelle and the core nacelle to generate fan thrust. A majority of propulsion thrust is provided by the pressurized fan air discharged through the fan exhaust nozzle, the remaining thrust provided from the combustion gases discharged through the core exhaust nozzle.

The fan nozzles of conventional gas turbine engines have a fixed geometry. The fixed geometry fan nozzles are a compromise suitable for take-off and landing conditions as well as for cruise conditions. Some gas turbine engines have implemented fan variable area nozzles. The fan variable area nozzle provide a smaller fan exit nozzle diameter during cruise conditions and a larger fan exit nozzle diameter during take-off and landing conditions. Existing fan variable area nozzles typically utilize relatively complex mechanisms that increase overall engine weight to the extent that the increased fuel efficiency typically associated with the use of a fan variable area nozzle may be negated.

SUMMARY OF THE INVENTION

A gas turbine engine according to an exemplary aspect of the present disclosure may include a core engine defined about an axis, a gear system driven by the core engine, the gear system defines a gear reduction ratio of greater than or equal to about 2.3, a fan driven by the gear system about the axis to generate a bypass flow, and a variable area flow system which operates to effect the bypass flow.

In a further non-limiting embodiment of any of the foregoing gas turbine engine embodiments, the variable area flow system may include an annular fan variable area nozzle (FVAN).

In a further non-limiting embodiment of any of the foregoing gas turbine engine embodiments, the gas turbine engine may include a gear system driven by the core engine to drive the fan. The gear system may define a gear reduction ratio of greater than or equal to about 2.5.

In a further non-limiting embodiment of any of the foregoing gas turbine engine embodiments, the gas turbine engine may include a gear system driven by the core engine to drive the fan. The gear system may define a gear reduction ratio of greater than or equal to 2.5.

In a further non-limiting embodiment of any of the foregoing gas turbine engine embodiments, the core engine may include a low pressure turbine which defines a pressure ratio that is greater than about five (5).

In a further non-limiting embodiment of any of the foregoing gas turbine engine embodiments, the core engine may include a low pressure turbine which defines a pressure ratio that is greater than five (5).

In a further non-limiting embodiment of any of the foregoing gas turbine engine embodiments, the bypass flow may define a bypass ratio greater than about six (6).

In a further non-limiting embodiment of any of the foregoing gas turbine engine embodiments, the bypass flow may define a bypass ratio greater than about ten (10).

In a further non-limiting embodiment of any of the foregoing gas turbine engine embodiments, the bypass flow may define a bypass ratio greater than ten (10).

In a further non-limiting embodiment of any of the foregoing gas turbine engine embodiments, the variable area flow system may operate to change a pressure ratio of the bypass flow.

In a further non-limiting embodiment of any of the foregoing gas turbine engine embodiments, the variable area flow system may operate to vary an area of a fan nozzle exit area for the bypass flow.

In a further non-limiting embodiment of any of the foregoing gas turbine engine embodiments, the fan may be defined for a predefined flight condition. Additionally or alternatively, the predefined flight condition may be about 0.8 MACH and about 35,000 feet. Additionally or alternatively, the predefined flight condition may be 0.8 MACH and 35,000 feet.

In a further non-limiting embodiment of any of the foregoing gas turbine engine embodiments, the fan may include fan blades designed at a particular fixed stagger angle related to the flight condition.

In a further non-limiting embodiment of any of the foregoing gas turbine engine embodiments, the variable area flow system may operate to adjust the bypass flow such that an angle of attack of the fan blades are maintained close to a design incidence at flight conditions other than the predefined flight condition.

A gas turbine engine according to another exemplary aspect of the present disclosure may include a core engine defined about an axis. The core engine may include a low pressure turbine which defines a pressure ratio that is greater than about five (5), a fan driven by the core engine about the axis to generate a bypass flow, and a variable area flow system which operates to effect the bypass flow.

In a further non-limiting embodiment of any of the foregoing gas turbine engine embodiments, the variable area flow system may include an annular fan variable area nozzle (FVAN).

In a further non-limiting embodiment of any of the foregoing gas turbine engine embodiments, the core engine may include a low pressure turbine which defines a pressure ratio that is greater than five (5).

In a further non-limiting embodiment of any of the foregoing gas turbine engine embodiments, the gas turbine engine may include a gear system driven by the core engine to drive the fan. The gear system may define a gear reduction ratio of greater than or equal to about 2.5.

In a further non-limiting embodiment of any of the foregoing gas turbine engine embodiments, the bypass flow may define a bypass ratio greater than about six (6). Additionally or alternatively, the bypass flow may define a bypass ratio greater than about ten (10). Additionally or alternative, the bypass flow may define a bypass ratio greater than ten (10).

In a further non-limiting embodiment of any of the foregoing gas turbine engine embodiments, the variable area flow system may operate to change a pressure ratio of the bypass flow. Additionally or alternatively, the variable area flow system may operate to vary an area of a fan nozzle exit area for the bypass flow.

In a further non-limiting embodiment of any of the foregoing gas turbine engine embodiments, the fan may be defined for a predefined flight condition. Additionally or alternatively, the flight condition may be about 0.8 MACH and about 35,000 feet.

In a further non-limiting embodiment of any of the foregoing gas turbine engine embodiments, the fan may include fan blades designed at a particular fixed stagger angle related to the predefined flight condition.

In a further non-limiting embodiment of any of the foregoing gas turbine engine embodiments, the variable area flow system may operate to adjust the bypass flow such that an angle of attack of the fan blades are maintained close to a design incidence at flight conditions other than the predefined flight condition.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
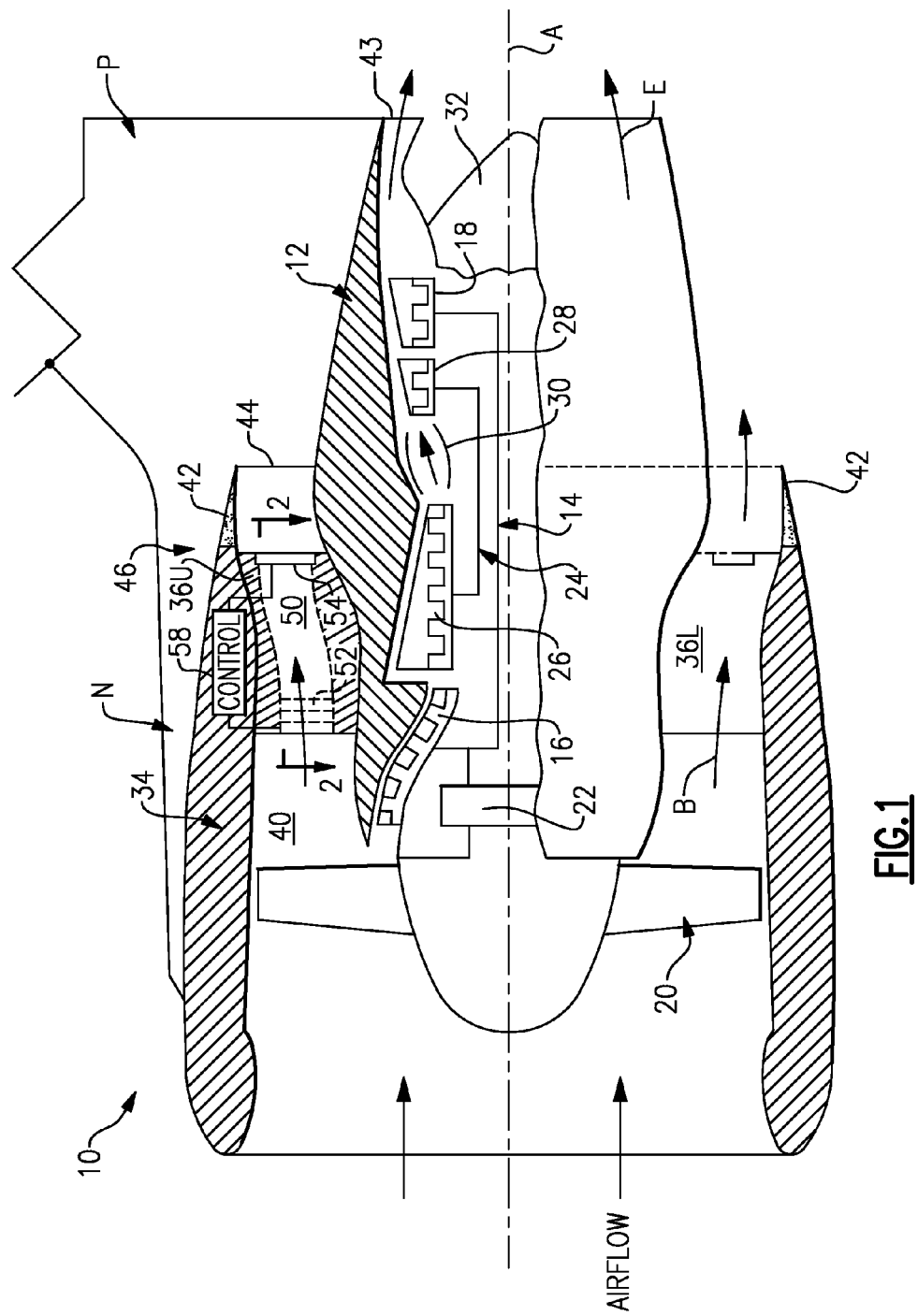
FIG. 1 is a general schematic partial fragmentary view of an exemplary gas turbine engine embodiment for use with the present invention.

FIG. 1 illustrates a general partial fragmentary schematic view of a gas turbofan engine 10 suspended from an engine pylon P within an engine nacelle assembly N as is typical of an aircraft designed for subsonic operation.

The turbofan engine 10 includes a core engine within a core nacelle 12 that houses a low spool 14 and high spool 24. The low spool 14 includes a low pressure compressor 16 and low pressure turbine 18. The low spool 14 drives a fan section 20 connected to the low spool 14 through a gear train 22. The high spool 24 includes a high pressure compressor 26 and high pressure turbine 28. A combustor 30 is arranged between the high pressure compressor 26 and high pressure turbine 28. The low and high spools 14, 24 rotate about an engine axis of rotation A.

The engine 10 is preferably a high-bypass geared turbofan aircraft engine. In one disclosed, non-limiting embodiment, the engine 10 bypass ratio is greater than about six (6) to ten (10), the gear train 22 is an epicyclic gear train such as a planetary gear system or other gear system with a gear reduction ratio of greater than about 2.3 and the low pressure turbine 18 has a pressure ratio that is greater than about 5. Preferably, the engine 10 bypass ratio is greater than ten (10), the fan diameter is significantly larger than that of the low pressure compressor 16, and the low pressure turbine 18 has a pressure ratio that is greater than 5. The gear train 22 is preferably an epicyclic gear train such as a planetary gear system or other gear system with a gear reduction ratio of greater than 2.5. It should be understood, however, that the above parameters are only exemplary of various preferred geared turbofan engines and that the present invention is likewise applicable to other gas turbine engines.

Airflow enters a fan nacelle 34 which at least partially surrounds the core nacelle 12. The fan section 20 communicates airflow into the core nacelle 12 to power the low pressure compressor 16 and the high pressure compressor 26. Core airflow compressed by the low pressure compressor 16 and the high pressure compressor 26 is mixed with the fuel in the combustor 30 where is ignited, and burned. The resultant high pressure combustor products are expanded through the high pressure turbine 28 and low pressure turbine 18. The turbines 28, 18 are rotationally coupled to the compressors 26, 16 respectively to drive the compressors 26, 16 in response to the expansion of the combustor product. The low pressure turbine 18 also drives the fan section 20 through the gear train 22. A core engine exhaust E exits the core nacelle 12 through a core nozzle 43 defined between the core nacelle 12 and a tail cone 32.

The core nacelle 12 is supported within the fan nacelle 34 by a pylon structure often generically referred to as an upper bifurcation 36U and lower bifurcation 36L, however, other types of pylons and supports at various radial locations may likewise be usable with the present invention.

A bypass flow path 40 is defined between the core nacelle 12 and the fan nacelle 34. The engine 10 generates a high bypass flow arrangement with a bypass ratio in which approximately 80 percent of the airflow entering the fan nacelle 34 becomes bypass flow B. The bypass flow B communicates through the generally annular (circumferentially broken only by the bifurcations 36U, 36L) bypass flow path 40 and is discharged from the engine 10 through an annular fan variable area nozzle (FVAN) 42 which defines a variable fan nozzle exit area 44 between the fan nacelle 34 and the core nacelle 12. The upper bifurcation 36U and the lower bifurcation 36L, although aerodynamically optimized (best seen in FIG. 2), occupies some portion of the volume between the core nacelle 12 and the fan nacelle 34.

Thrust is a function of density, velocity, and area. One or more of these parameters can be manipulated to vary the amount and direction of thrust provided by the bypass flow B. The upper bifurcation 36U preferably includes a pylon variable area flow system 50 having a passage 56 defined between a pylon intake 52 and a pylon exhaust 54 to selectively vary the FVAN 42 area through which bypass flow B may pass. Preferably, both the pylon intake 52 and the pylon exhaust 54 are variable and controlled in response to a controller 58. It should be understood that although the upper bifurcation 36U is illustrated in the disclosed embodiment as having the pylon variable area flow passage 50, the lower bifurcation as well as other pylon structures may likewise include such variable area flow systems.

Figure 2:
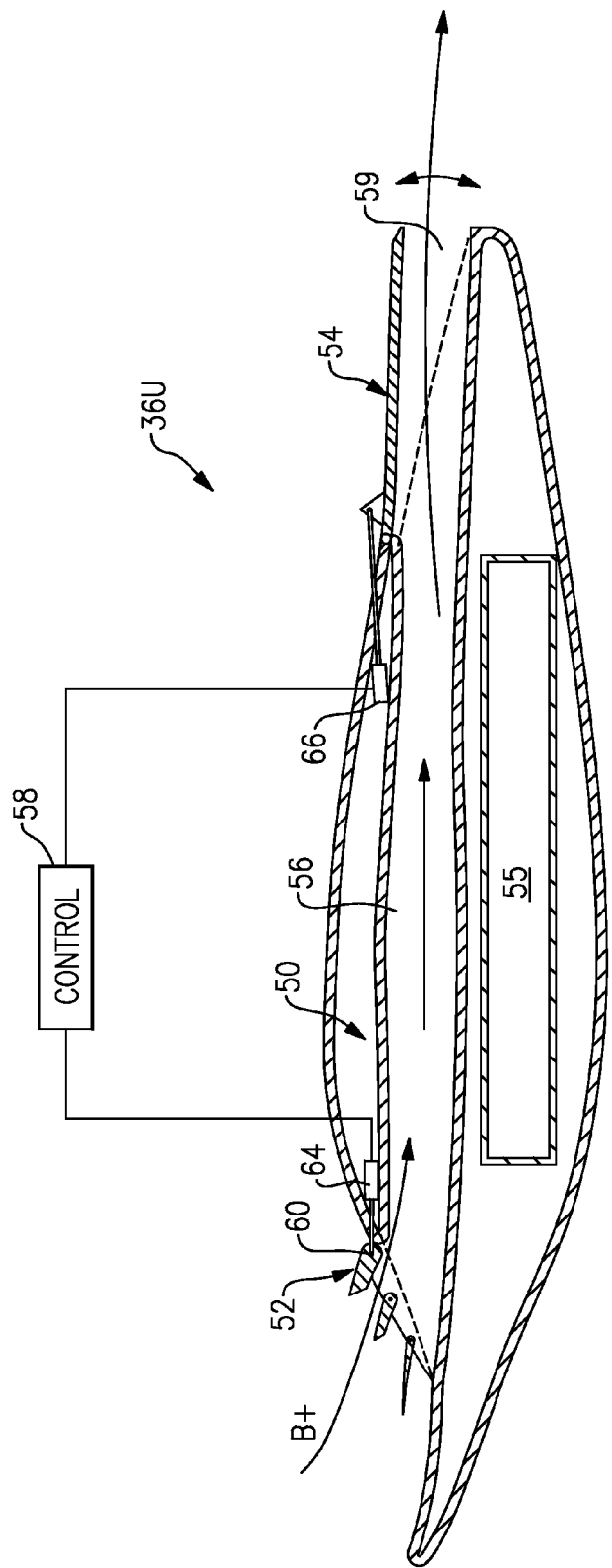
FIG. 2 is a sectional view through an engine pylon of the engine of FIG. 1 at line 2-2 to illustrate a variable area flow system.

Referring to FIG. 2, the pylon variable area flow system 50 changes the pressure ratio of the bypass flow B. That is, the nozzle exit area 44 is effectively varied in area by opening and closing the additional flow area of the pylon variable area flow system 50 to vary the bypass flow B. It should be understood that various actuators 64, 66 in communication with the controller 58 may be utilized to operate the pylon intake 52 and the pylon exhaust 54 in response to predetermined flight conditions. It should be understood that either of the pylon intake 52 and the pylon exhaust 54 may be fixed but it is preferred that both are adjustable in response to the controller 58 to control the flow area through the flow passage 56.

The flow passage 56 is defined around a component duct 55 within the upper bifurcation 36U which provides a communication path for wiring harnesses, fluid flow conduits and other components to the core nacelle 12 from, for example, the aircraft wing. It should be understood that various flow passage 56 paths will likewise be usable with the present invention.

The pylon intake 52 preferably includes an adjustable intake such as a louver system 60 with empirically-designed turning vanes which most preferably have a variation of height to minimize the "shadowing" effect created by each upstream louver relative the next downstream louver.

The pylon exhaust 54 preferably includes a variable nozzle 58. The variable nozzle 59 may include doors, flaps, sleeves or other movable structure which control the volume of additional fan bypass flow B+ through the FVAN 42.

The pylon variable area flow system 50 changes the physical area through which the bypass flow B may pass. A significant amount of thrust is provided by the bypass flow B due to the high bypass ratio. The fan section 20 of the engine 10 is preferably designed for a particular flight condition—typically cruise at about 0.8 MACH and about 35,000 feet. It should be understood that other arrangements as well as essentially infinite intermediate positions are likewise usable with the present invention.

In operation, the pylon variable area flow system 50 communicates with the controller 58 to effectively vary the area of the fan nozzle exit area 44 through independent or coordinated operation of the pylon intake 52 and the pylon exhaust 54. Other control systems including an engine controller, a flight control computer or the like may also be usable with the present invention. As the fan blades of fan section 20 are efficiently designed at a particular fixed stagger angle for the cruise condition, the pylon variable area flow system 50 is operated to vary the area of the fan nozzle exit area 44 to adjust fan bypass air flow such that the angle of attack or incidence of the fan blades are maintained close to the design incidence at other flight conditions, such as landing and takeoff as well as to meet other operational parameters such as noise level. Preferably, the pylon variable area flow system 50 is closed to define a nominal cruise position fan nozzle exit area 44 and is opened for other flight conditions. The pylon variable area flow system 50 preferably provides an approximately 20% (twenty percent) effective area change in the fan nozzle exit area 44.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A gas turbine engine comprising:
   a core engine defined about an axis and including a core nacelle;
   a gear system driven by said core engine;
   a fan driven by said gear system about said axis to generate a bypass flow, the fan including a fan nacelle;
   at least one bifurcation extending between the fan nacelle and said core nacelle in a radial direction and extending between a leading edge and a trailing edge in an axial direction, wherein said at least one bifurcation includes a fore end face at the leading edge that directly faces the fan and an aft end face at the trailing edge that faces opposite the fore end face; and
   a pylon variable area flow system which operates to effect said bypass flow, wherein said pylon variable area flow system has an internal flow passage defined within said at least one bifurcation between a pylon intake open to the leading edge at the fore end face and a pylon exhaust open to the trailing edge at the aft end face.

2. The engine as recited in claim 1, including an annular fan variable area nozzle (FVAN), and wherein the internal flow passage is defined within said at least one bifurcation to extend between the pylon intake located at the leading edge and the pylon exhaust located at the trailing edge such that upstream bypass flow enters the pylon intake, flows through the bifurcation from the leading edge to the trailing edge via the internal flow passage, and exits back into the bypass flow downstream of the bifurcation.

3. The engine as recited in claim 1, wherein said pylon variable area flow system operates to change a pressure ratio of the bypass flow.

4. The engine as recited in claim 1, wherein said pylon variable area flow system operates to vary an area of a fan nozzle exit area for said bypass flow.

5. The engine as recited in claim 1, wherein said fan is configured for a predefined flight condition.

6. The engine as recited in claim 5, wherein said predefined flight condition is 0.8 MACH and 35,000 feet.

7. The engine as recited in claim 5, wherein said fan includes fan blades designed at a particular fixed stagger angle related to said predefined flight condition, and wherein said pylon intake directly faces said fan blades.

8. The engine as recited in claim 7, wherein said pylon variable area flow system operates to adjust the bypass flow such that an angle of attack of said fan blades are maintained close to a design incidence at flight conditions other than said predefined flight condition.

9. The engine as recited in claim 1, including an annular fan variable area nozzle at a downstream end of said fan nacelle which defines a variable fan nozzle exit area for bypass flow.

10. The engine as recited in claim 9, wherein said pylon variable area flow system selectively varies the variable fan nozzle exit area.

11. The engine as recited in claim 10, wherein at least one of the pylon intake and the pylon exhaust are selectively variable.

12. The engine as recited in claim 11, wherein said pylon intake comprises an adjustable intake that includes a plurality of turning vanes located at the leading edge.

13. The engine as recited in claim 11, wherein said pylon exhaust comprises an adjustable exhaust that includes a variable nozzle at the trailing edge.

14. The engine as recited in claim 9, wherein said flow passage is defined around a component duct within the at least one bifurcation that provides a communication path to the core nacelle from an aircraft wing for at least one of a wiring harness, fluid flow conduit, or other aircraft component.

15. The engine as recited in claim 1 wherein said pylon intake comprises an adjustable intake that includes a plurality of turning vanes at the leading edge, and wherein said pylon exhaust comprises an adjustable exhaust that includes a variable nozzle.

16. A gas turbine engine comprising:
a core engine defined about an axis and including a core nacelle;
a gear system driven by said core engine;
a fan driven by said gear system about said axis to generate a bypass flow, the fan including a fan nacelle;
at least one bifurcation extending between the fan nacelle and said core nacelle in a radial direction and extending between a leading edge and a trailing edge in an axial direction, wherein said at least one bifurcation includes a fore end face at the leading edge that directly faces the fan and an aft end face at the trailing edge that faces opposite the fore end face; and
a pylon variable area flow system which operates to effect said bypass flow, wherein said pylon variable area flow system has an internal flow passage defined within said at least one bifurcation between a pylon intake at the leading edge and a pylon exhaust at the trailing edge, and wherein said pylon intake comprises an adjustable intake that includes a plurality of turning vanes at the leading edge, and wherein said pylon exhaust comprises an adjustable exhaust that includes a variable nozzle.

17. The engine as recited in claim 16, wherein said core engine includes a low pressure turbine.

18. The engine as recited in claim 16, wherein said fan nacelle is radially outward of said core nacelle to define a variable fan nozzle exit area for bypass flow, and wherein the internal flow passage is defined within said at least one bifurcation to extend between the pylon intake open to the leading edge at the fore end face and the pylon exhaust open to the trailing edge at the aft end face such that upstream bypass flow enters the pylon intake, flows through the bifurcation from the leading edge to the trailing edge via the internal flow passage, and exits back into the bypass flow downstream of the bifurcation such that the pylon variable area flow system selectively varies the variable fan nozzle exit area.

19. The engine as recited in claim 18, wherein said flow passage is defined around a component duct within the at least one bifurcation that provides a communication path to the core nacelle from an aircraft wing for at least one of a wiring harness, fluid flow conduit, or other aircraft component.

20. A gas turbine engine comprising:
a core engine defined about an axis, said core engine includes a core nacelle and a low pressure turbine;
a fan driven by said core engine about said axis to generate a bypass flow, wherein said fan includes a fan nacelle radially outward of said core nacelle to define a variable fan nozzle exit area for bypass flow;
at least one bifurcation extending between said fan nacelle and said core nacelle in a radial direction and extending between a leading edge and a trailing edge in an axial direction, wherein said at least one bifurcation includes a fore end face at the leading edge that directly faces the fan and an aft end face at the trailing edge that faces opposite the fore end face; and
a pylon variable area flow system which operates to effect said bypass flow, wherein said pylon variable area flow system has a flow passage defined within said at least one bifurcation between a pylon intake open to the leading edge at the fore end face and a pylon exhaust open to the trailing edge at the aft end face, wherein at least one of the pylon intake and the pylon exhaust are selectively variable, and wherein the pylon variable area flow system selectively varies the variable fan nozzle exit area.

21. The engine as recited in claim 20, including an annular fan variable area nozzle (FVAN) at a downstream end of said fan nacelle, and wherein said annular fan variable area nozzle defines said variable fan nozzle exit area, and wherein the pylon variable area flow system has a flow passage defined within said at least one bifurcation to extend between the pylon intake located at the leading edge and the pylon exhaust located at the trailing edge such that upstream bypass flow enters the pylon intake, flows through the bifurcation from the leading edge to the trailing edge via the flow passage, and exits back into the bypass flow downstream of the bifurcation.

22. The engine as recited in claim 20, further comprising a gear system driven by said core engine to drive said fan.

23. The engine as recited in claim 20, wherein said pylon variable area flow system operates to change a pressure ratio of the bypass flow.

24. The engine as recited in claim 20, wherein said fan is configured for a predefined flight condition.

25. The engine as recited in claim 24, wherein said predefined flight condition is 0.8 MACH and 35,000 feet.

26. The engine as recited in claim 25, wherein said fan includes fan blades designed at a particular fixed stagger angle related to said predefined flight condition, and wherein said pylon intake directly faces said fan blades.

27. The engine as recited in claim 26, wherein said pylon variable area flow system operates to adjust the bypass flow such that an angle of attack of said fan blades are maintained close to a design incidence at flight conditions other than said predefined flight condition.

28. The engine as recited in claim 20, wherein said pylon intake comprises an adjustable intake that includes a plurality of turning vanes at the leading edge.

29. The engine as recited in claim 20, wherein said pylon exhaust comprises an adjustable exhaust that includes a variable nozzle at the trailing edge.

30. The engine as recited in claim 20, wherein said flow passage is defined around a component duct within the at least one bifurcation that provides a communication path to the core nacelle from an aircraft wing for at least one of a wiring harness, fluid flow conduit, or other aircraft component.

31. The engine as recited in claim 20 wherein said pylon intake comprises an adjustable intake that includes a plurality of turning vanes at the leading edge, and wherein said pylon exhaust comprises an adjustable exhaust that includes a variable nozzle.

\* \* \* \* \*

UNITED STATES PATENT AND TRADEMARK OFFICE
CERTIFICATE OF CORRECTION

PATENT NO. : 9,885,313 B2
APPLICATION NO. : 13/343964
DATED : February 6, 2018
INVENTOR(S) : Constantine Baltas Page 1 of 1

It is certified that error appears in the above-identified patent and that said Letters Patent is hereby corrected as shown below:

On the Title Page

Related U.S. Application Data:
(63) "Continuation-in-part of application No. 12/441,546, filed on Mar. 17, 2009, now Pat. No. 8,418,471."
Should read as:
-- Continuation-in-part of application No. 12/441,546, filed as application No. PCT/2006/040251 on October 12, 2006, now Pat. No. 8,418,471. --

Signed and Sealed this
Fourth Day of September, 2018

Andrei Iancu
*Director of the United States Patent and Trademark Office*